United States Patent [19]
Villalba

[11] Patent Number: 5,754,694
[45] Date of Patent: May 19, 1998

[54] SYSTEM AND METHOD FOR DISTINGUISHING OBJECTS

[75] Inventor: Michael Joseph Villalba, Plano, Tex.

[73] Assignee: Texas Instruments Incorporated, Dallas, Tex.

[21] Appl. No.: 478,710

[22] Filed: Jun. 7, 1995

Related U.S. Application Data

[63] Continuation of Ser. No. 906,917, Jun. 30, 1992, abandoned.
[51] Int. Cl.$^6$ ...................................................... G06K 9/68
[52] U.S. Cl. ............................................ 382/226; 382/103
[58] Field of Search ............................ 382/224, 226, 382/227, 228, 209, 103; 348/135, 113, 117

[56] References Cited

U.S. PATENT DOCUMENTS 4,944,023  7/1990  Imao et al. ........................... 382/226
5,123,057  6/1992  Verly et al. ........................... 382/226

*Primary Examiner*—Yon Couso
*Attorney, Agent, or Firm*—W. Daniel Swayze, Jr.; W. James Brady, III; Richard L. Donaldson

[57] ABSTRACT

A method and system are provided for distinguishing objects. Signals representative of the objects are input (63). From the signals, measurements of multiple types are acquired (64). At least one of the measurement types is continuously variable. In response to the measurements, respective amounts of mutual information of the measurement types are determined (70). In response to the respective amounts of mutual information, at least one measurement type is selected for evaluation in distinguishing the objects (72).

9 Claims, 7 Drawing Sheets

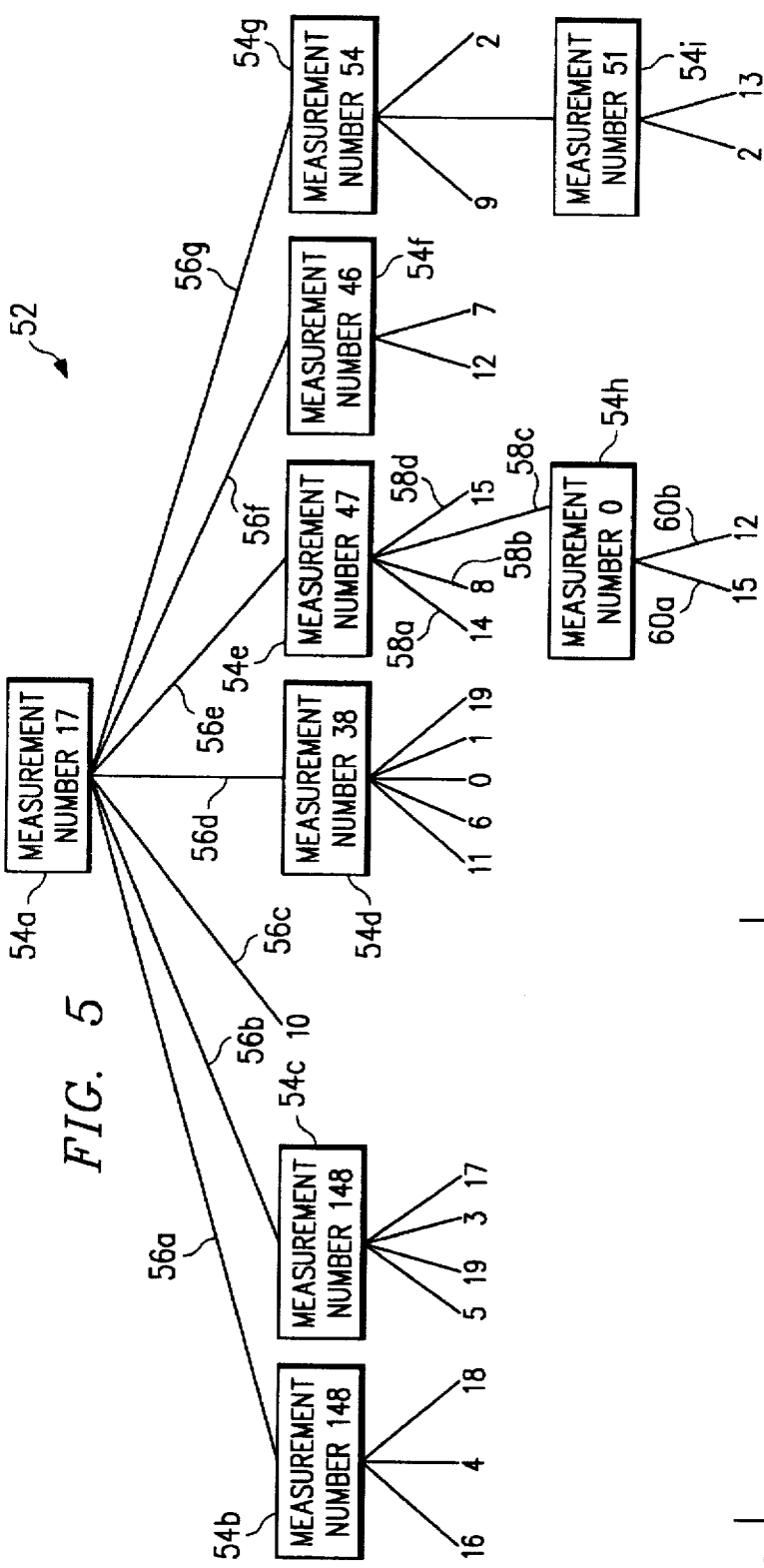
FIG. 5
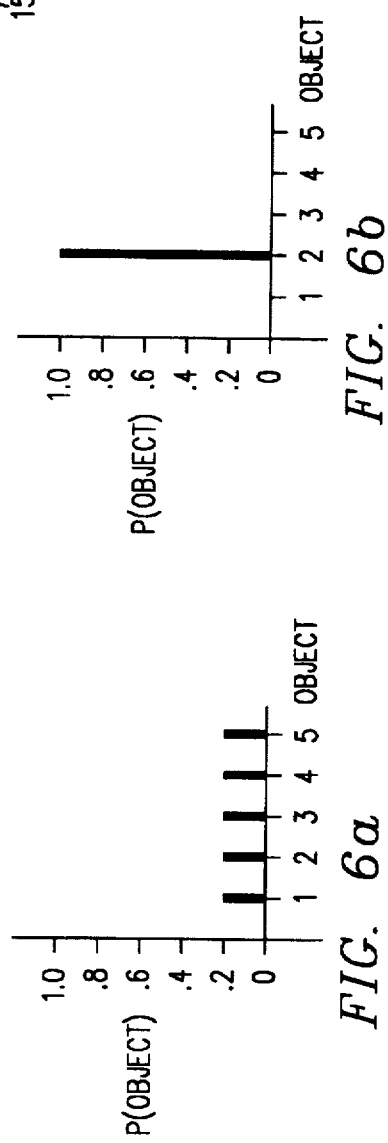
FIG. 6a
FIG. 6b

SYSTEM AND METHOD FOR DISTINGUISHING OBJECTS

This is a Continuation of application Ser. No. 07/906,917, filed Jun. 30, 1992 now abandoned.

TECHNICAL FIELD OF THE INVENTION

This invention relates in general to signal processing, and in particular to a method and system for distinguishing objects.

BACKGROUND OF THE INVENTION

Various types of signals are processed. In voice signals, amplitude values are typically a function of time. In image signals, pixel intensity values are typically a function of (x,y) coordinates in an image. Such signals can be processed to distinguish one or more objects represented in the signals. For example, amplitude values in voice signals can be processed to distinguish objects such as spoken words represented in the voice signals. Similarly, pixel intensity values in image signals can be processed to distinguish one or more target objects represented in the image.

Such objects can be distinguished by processing the signals to acquire various types of measurements. The acquired measurements are evaluated relative to known measurements ("features") of objects in order to distinguish an object as being either represented or not represented in the signals. In evaluating acquired measurements, efficiency is desirably increased by selecting the acquired measurements for evaluation in an optimal order, so that uncertainty regarding the object's representation is eliminated in a short amount of processing time.

According to many previous techniques, a human developer manually selects measurements for evaluation, relying upon the human developer's subjective intuition concerning the manner in which acquired measurements relate to the goal of distinguishing objects. Nevertheless, such introspective techniques might have poor effectiveness if acquired measurements are difficult to relate to the goal of distinguishing the object. For example, it is difficult to intuitively relate the raw signal output from a naval inverse synthetic aperture radar ("ISAR") to target objects for recognition.

In some previous techniques, predefined types of measurements are always evaluated. A shortcoming of such techniques is that they fail to adapt to a recognition domain by selecting measurements for evaluation according to each measurement's usefulness. A recognition domain includes the signal acquisition device, signal environment, available measurement types, and objects to be distinguished. Essentially, such previous techniques have relatively poor efficiency and poor robustness, because they evaluate measurements according to a preconceived recognition strategy rather than by adapting to the recognition domain. Moreover, such previous techniques are frequently ineffective at distinguishing among a large number of different objects.

Certain previous techniques use a binary decision tree having one or more nodes each specifying an associated measurement for evaluation. Each node has only two branches separated by a single associated threshold value. As the binary decision tree is traversed, one of a node's two branches is specified in response to an evaluated measurement either satisfying or failing to satisfy the single threshold value. Often, it is desirable to represent more than two values for a measurement. In this case, the binary decision tree uses more than one node to represent the measurement's value. For example, a measurement for which it is desirable to represent three values would require two binary nodes.

By requiring more than one node to represent such a measurement's value, binary decision trees inefficiently occupy additional system memory, and additional processing time is consumed in traversing the binary decision tree. Accordingly, binary decision trees fail to select a suitable number of branches by adapting to a recognition domain. Likewise, binary decision trees fail to select suitable threshold values associated with the suitably selected number of branches by adapting to the recognition domain.

In response to available measurements, it might be impractical to distinguish objects in an absolutely reliable manner. In such cases, some previous techniques fail to provide a sufficiently accurate estimate of their reliability in distinguishing objects in response to available measurements.

Also, some previous techniques fail to provide a sufficiently accurate estimate of a measurement's probability of having a value within a specified range.

Thus, a need has arisen for a method and system for distinguishing among a large number of different objects in an efficient and robust manner. A need has also arisen for a method and system for distinguishing objects in a short amount of processing time. A further need has arisen for a method and system for distinguishing objects, in which system memory is efficiently occupied. Moreover, a need has arisen for a method and system for distinguishing objects by adapting to a recognition domain. Another need has arisen for a method and system for distinguishing objects, in which a sufficiently accurate estimate is provided of reliability in distinguishing objects in response to available measurements.

Also, a need has arisen for a method and system for distinguishing objects, in which measurements are objectively selected for evaluation in an optimal order. Further, a need has arisen for a method and system for distinguishing objects, in which measurements are selected for evaluation according to each measurement's usefulness by adapting to a recognition domain. An even further need has arisen for a method and system for distinguishing objects, in which measurements are effectively selected for evaluation even if introspection is difficult.

Additionally, a need has arisen for a method and system for distinguishing objects, in which more than two possible measurement values are represented in an efficient manner. Yet a further need has arisen for a method and system for distinguishing objects, in which a suitable number of branches is selected for a node of a decision tree, and in which one or more suitable threshold values associated with the suitably selected number of branches are selected by adapting to a recognition domain.

Finally, a need has arisen for a method and system for providing a sufficiently accurate estimate of a measurement's probability of having a value within a specified range.

SUMMARY OF THE INVENTION

It is a technical advantage of the present invention that a large number of different objects are distinguished.

It is another technical advantage of the present invention that objects are distinguished in an efficient and robust manner.

It is a further technical advantage of the present invention that objects are distinguished in a short amount of processing time.

It is yet another technical advantage of the present invention that system memory is efficiently occupied.

It is yet a further technical advantage of the present invention that objects are distinguished by adapting to a recognition domain.

In another technical advantage of the present invention, a sufficiently accurate estimate is provided of reliability in distinguishing objects in response to available measurements.

In a first aspect of a method and system for distinguishing objects, signals representative of the objects are input. From the signals, measurements of multiple types are acquired. At least one of the measurement types is continuously variable. In response to the measurements, respective amounts of mutual information of the measurement types are determined. In response to the respective amounts of mutual information, at least one measurement type is selected for evaluation in distinguishing the objects.

It is a technical advantage of this aspect that measurements are objectively selected for evaluation in an optimal order.

It is another technical advantage of this aspect that measurements are selected for evaluation according to each measurement's usefulness by adapting to a recognition domain.

It is a further technical advantage of this aspect that measurements are effectively selected for evaluation even if introspection is difficult.

In a second aspect, in response to the measurements, a continuously variable measurement type is quantized into a number of intervals selected in response to mutual information of the quantized continuously variable measurement type. In response to the quantized continuously variable measurement type, at least one measurement from a set of signals is evaluated for distinguishing at least one of the objects as being represented in the set of signals.

It is a technical advantage of this aspect that more than two possible measurement values are represented in an efficient manner.

It is another technical advantage of this aspect that a suitable number of branches is selected for a node of a decision tree by adapting to a recognition domain.

It is a further technical advantage of this aspect that one or more suitable threshold values associated with the suitably selected number of branches are selected by adapting to a recognition domain.

In a third aspect, a probability density of a measurement type is determined. Signals are input. From the signals, measurements of the measurement type are acquired. In response to the measurements, kernels are formed. Each kernel is associated with one of the measurements. Each kernel has a respective size selected in response to ones of the measurements in a locality of the associated measurement. The probability density is determined in response to the kernels.

It is a technical advantage of this aspect that a sufficiently accurate estimate is provided of a measurement's probability of having a value within a specified range.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates an exemplary n-ary decision tree formed by process circuitry of FIG. 3 to specify measurements for evaluation in an optimal order;

FIGS. 6a–b are exemplary graphs of object probability versus object type for different types of objects in an object set;

DETAILED DESCRIPTION OF THE INVENTION

The preferred embodiment of the present invention and its advantages are best understood by referring to FIGS. 1 through 14 of the drawings, like numerals being used for like and corresponding parts of the various drawings.

Figure 1:
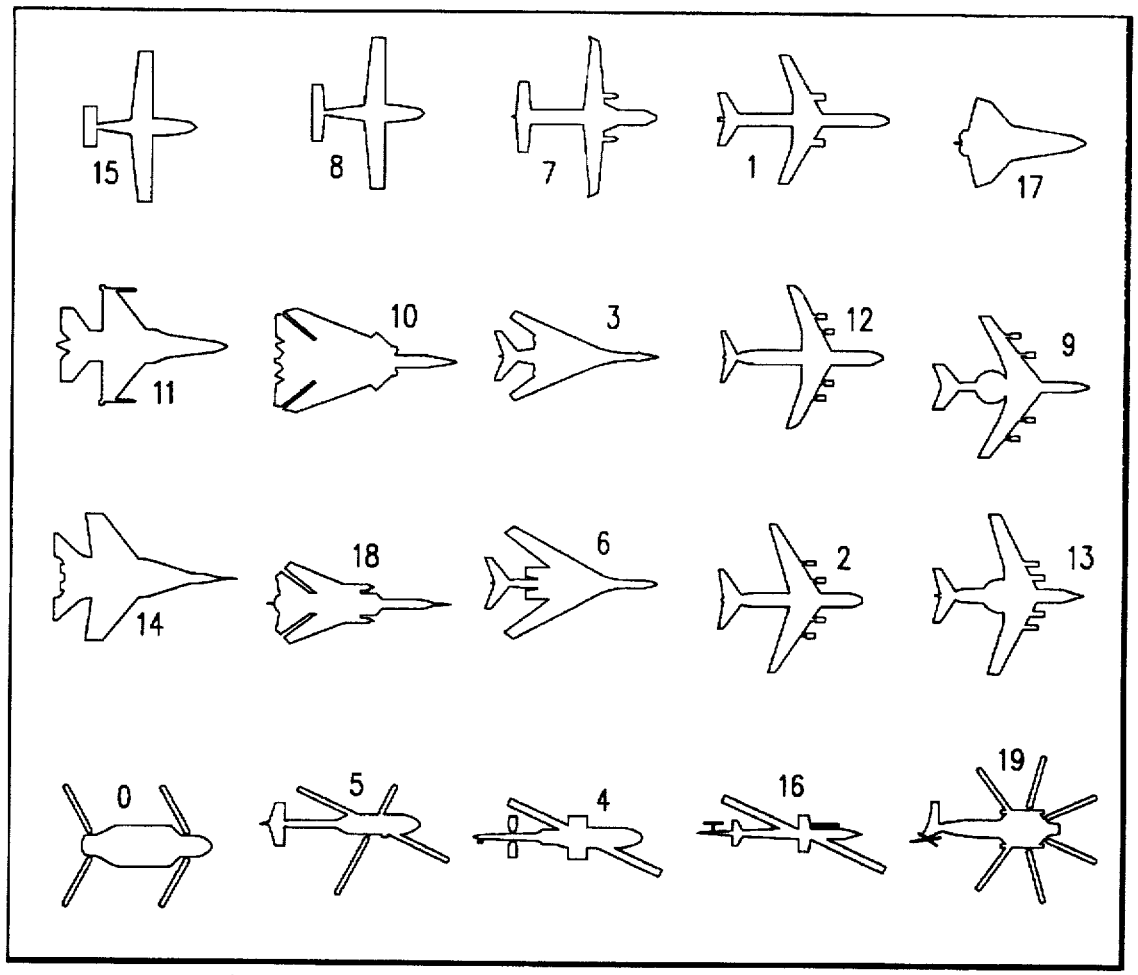
FIG. 1 illustrates an exemplary set of objects to be distinguished as being either represented or not represented in a set of signals.

FIG. 1 illustrates an exemplary set, indicated generally at 20, of twenty objects numbered 0, 1, 2, 3, 4, 5, 6, 7, 8, 9, 10, 11, 12, 13, 14, 15, 16, 17, 18 and 19, to be distinguished as being either represented or not represented in a set of signals. Although all objects in set 20 are aircraft target objects to be distinguished in a set of image signals, set 20 can include any type of object (such as a spoken word) to be distinguished as being either represented or not represented in any type of signal (such as voice signals). Moreover, set 20 can include other types of target objects such as terrain obstacles, ground targets and enemy weapons.

Further, set 20 can include ground objects such as crop types, rivers, mountains and other elements. Such ground objects can be represented in image signals sensed by an earth resource satellite sensor located aboard an earth orbiting satellite. Also, set 20 can include character objects to be distinguished in typed or handwritten text after optical scanning. Similarly, set 20 can include fingerprint or face patterns to be distinguished by a security system.

Figure 2:
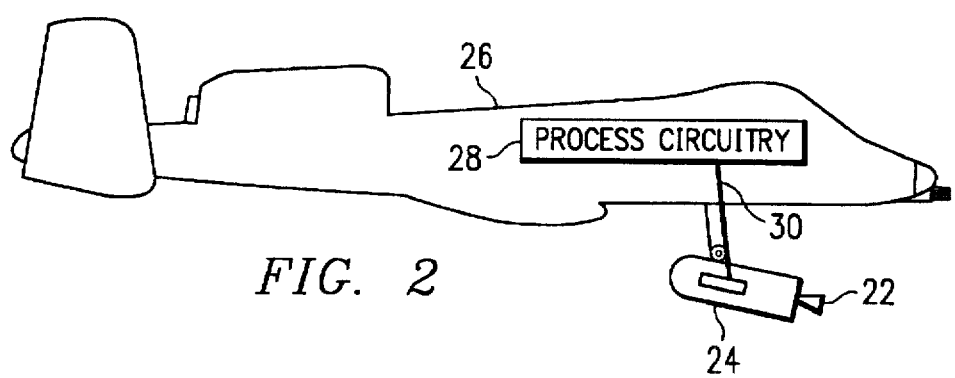
FIG. 2 illustrates a sensor carried by a platform located on an aircraft.

FIG. 2 illustrates a sensor 22 carried by a platform 24 located on an aircraft 26. Alternatively, platform 24 can be located on any type of moving vehicle such as a tank, or can be located at a stationary site. In FIG. 2, sensor 22 is a forward looking infrared ("FLIR") sensor. Aircraft 26 further includes process circuitry 28 connected to sensor 22 by electrical path 30.

Sensor 22 senses signals for processing by process circuitry 28 to distinguish one or more objects as being either represented or not represented in the signals. As shown in FIG. 2, sensor 22 and process circuitry 28 form an automatic target recognition ("ATR") system where process circuitry 28 distinguishes one or more of target objects 0–19 (FIG. 1) as being either represented or not represented in image signals sensed by sensor 22.

In an exemplary alternative embodiment, sensor 22 can be a microphone for sensing voice signals. In such an alternative embodiment, process circuitry 28 and sensor 22 form a voice recognition system, where process circuitry 28 distinguishes one or more spoken words as being either represented or not represented in voice signals sensed by sensor 22.

Figure 3:
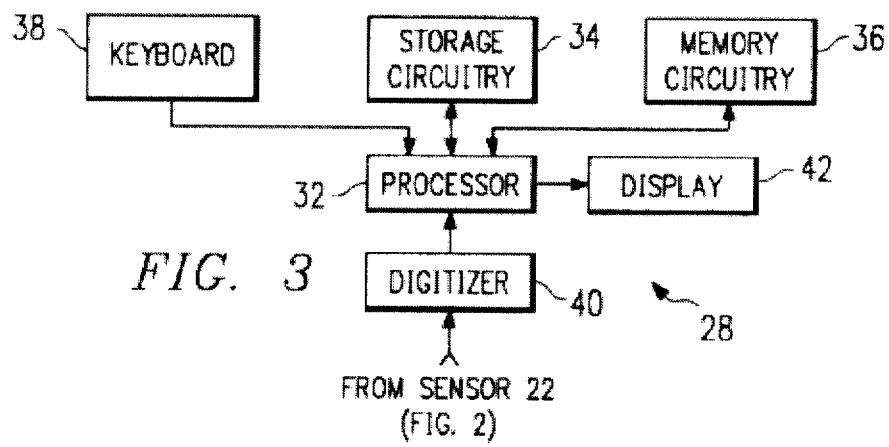
FIG. 3 is a block diagram of process circuitry of the preferred embodiment.

FIG. 3 is a block diagram of process circuitry 28. Process circuitry 28 includes a processor 32 programmed in accordance with the preferred embodiment for distinguishing one or more objects. Processor 32 is connected to non-volatile storage circuitry 34, such as a battery backed static random access memory ("SRAM"). Storage circuitry 34 stores instructions and other digital data used by processor 32 in distinguishing objects. Processor 32 reads digital data and instructions from storage circuitry 34, as needed, to distinguish one or more objects. Moreover, processor 32 writes digital data to storage circuitry 34 so that results of the object distinguishing process are stored in a non-volatile manner. The object distinguishing process is described further hereinbelow in connection with FIGS. 4–14.

Processor 32 is further connected to fast-access memory circuitry 36, such as a dynamic random access memory ("DRAM"). Memory circuitry 36 inputs, stores and outputs instructions and other frequently accessed data as directed by processor 32 during the object distinguishing process. By storing such frequently accessed data in memory circuitry 36 instead of in storage circuitry 34, speed of the object distinguishing process is increased. A human operator (not shown) can specify commands and data to processor 32 using a keyboard 38. A digitizer 40 inputs signals from sensor 22 (FIG. 2). After inputting signals from sensor 22, digitizer 40 translates the signals into digital data for output to processor 32. In response to the digital data from digitizer 40, processor 32 distinguishes one or more objects and displays results of the object distinguishing process on a display 42.

With advances in very large scale integration ("VLSI") technology and military computing hardware, special purpose parallel architectures can be used for real-time processing. Accordingly, in response to distinguishing a target object, processor 32 outputs digital data to display 42, so that a human operator (not shown) in aircraft 26 (FIG. 2) is notified that a distinguished target object was within view of sensor 22. The human operator can take action to evade or debilitate a target object distinguished by process circuitry 28 as being potentially dangerous, such as a ground obstacle or an enemy weapon. In an alternative embodiment, processor 32 outputs digital signals to special purpose hardware (not shown) for automatically taking action to evade or debilitate the potentially dangerous target object.

In order to quickly evade or debilitate a target object distinguished as being potentially dangerous, it is desirable to perform the object distinguishing process in a fast and reliable manner. If the object distinguishing process is slow or inaccurate, then the potentially dangerous target object might be considerably outside the view of sensor 22 before suitable evasive or debilitating action can be taken.

Figure 4A:
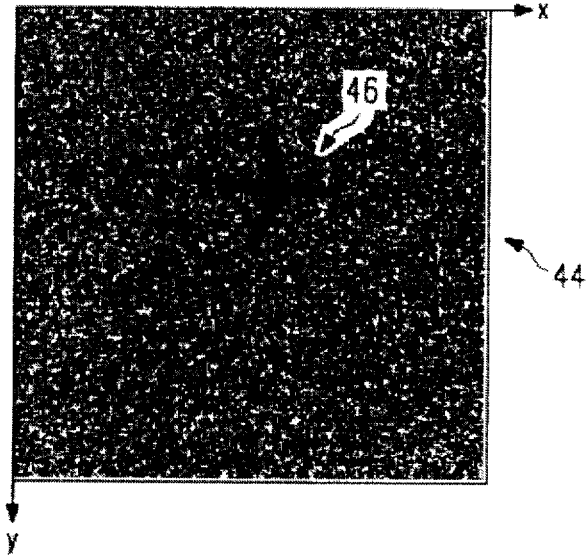
FIGS. 4a–b are exemplary images of a target object to be distinguished as being represented in image signals sensed by the sensor of FIG. 2.

FIG. 4a is an exemplary image 44 of a target object, indicated generally at 46. Target object 46 is distinguishable as representing target object 12 of FIG. 1. Image 44 is synthetically generated and embedded in 30% binary white noise. Referring also to FIG. 3, image 44 is illustrative of an image represented by digital data output from digitizer 40 to processor 32. In FIG. 4a, such digital data specifies which (x,y) coordinate pixels of image 44 are black. Processor 32 inputs such digital data from digitizer 40 after digitizer 40 translates image signals from sensor 22.

Figure 4B:
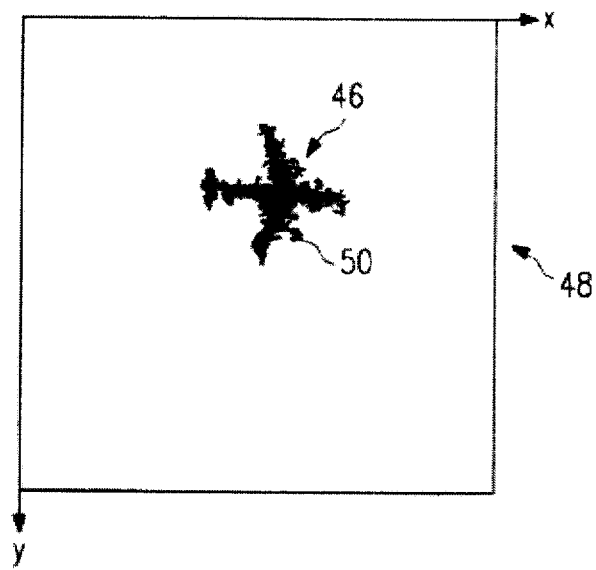

After processor 32 inputs such digital data from digitizer 40, processor 32 directs display 42 to display image 44. Also, processor 32 processes image 44 to identify a region of image 44 that substantially includes target object 46. An exemplary technique for identifying such a region is to isolate the largest continuously connected set of pixels ("pixel set") within image 44. FIG. 4b is an image 48 of such a pixel set 50 that substantially includes target object 46. As shown in FIG. 4b, the binary white noise of image 44 is substantially eliminated by displaying only pixel set 50 in image 48. Alternatively, any suitable segmentation technique can be used to identify a region of image 44 that substantially includes target object 46.

After processor 32 identifies pixel set 50 of image 48 as a region of image 44 that substantially includes target object 46, processor 32 further processes image 48 to acquire various types of measurements. Appendix I describes 149 exemplary types of measurements acquired by processor 32 in response to an image such as image 48 of FIG. 4b. The measurement types described in Appendix I are characteristic, to varying degrees, of objects in an automated target recognition domain.

In an important aspect of the preferred embodiment, process circuitry 28 is adaptable to any recognition domain. Accordingly, process circuitry 28 alternatively can acquire suitable types of measurements in response to an image (such as image 44 of FIG. 4a), without having to first identify a region (such as pixel set 50 in FIG. 4b) that substantially includes target object 46. Similarly, in the recognition domain of distinguishing spoken words in voice signals, process circuitry 28 processes voice signals in order to acquire suitable types of measurements that are characteristic, to varying degrees, of one or more word objects to be distinguished.

In yet another exemplary recognition domain, object situations are distinguished. For example, if only a single target object (such as target object 12 in FIG. 1) is to be recognized as being represented in image signals, then process circuitry 28 essentially distinguishes two object situations, namely a first object situation where the single target object is represented in the image signals, and a second object situation where the single target object is not represented in the image signals.

In another example of distinguishing object situations, process circuitry 28 processes signals sensed from a heart patient in order to acquire characteristic measurements such as blood pressure, pulse and temperature. Process circuitry 28 evaluates such measurements to distinguish object situations, such as a health condition of the heart patient. In response to a distinguished object situation, an appropriate course of action is identifiable for treating the heart patient.

Referring again to FIG. 4a, target object 46 is distinguishable as representing target object 12 of FIG. 1. Accordingly, in response to the signals from sensor 22, process circuitry 28 acquires measurements (such as measurements 0–148 of Appendix I) from the signals, and distinguishes target object 12 as being represented in the signals by evaluating the acquired measurements.

In evaluating acquired measurements, process circuitry 28 desirably increases efficiency by selecting acquired measurements for evaluation in an optimal order, so that uncertainty regarding the object's representation is eliminated in a short amount of processing time. Such a technique for selecting measurements for evaluation is effective, even if introspection is difficult.

FIG. 5 illustrates an exemplary n-ary decision tree, indicated generally at 52, of the preferred embodiment, which is formed by process circuitry 28 to specify measurements for evaluation in an optimal order. In the preferred embodiment, a decision tree (such as decision tree 52) is formed by process circuitry 28 in advance of inputting signals from sensor 22. In decision tree 52 of FIG. 5, each of measurement nodes 54a–i specifies an associated type of measurement in Appendix I for evaluation.

For example, root measurement node 54a specifies measurement #17 ("1/eccentricity") of Appendix I for evaluation. Each of measurement nodes 54a–i may have more than two associated branches. For example, root measurement node 54a has seven associated branches 56a–g. Adjacent branches are separated by an associated threshold value. Accordingly, adjacent branches 56a–b are separated by an associated threshold value. Likewise, adjacent branches 56b–c are separated by an associated threshold value.

After process circuitry 28 forms a decision tree (such as decision tree 52), process circuitry 28 inputs signals from sensor 22, acquires measurements from the signals, and distinguishes one or more objects as being represented in the signals by traversing a path of the decision tree. For example, process circuitry 28 traverses a path of decision tree 52 by first evaluating the measurement type specified at root measurement node 54a. Accordingly, if measurement #17 has a value between the associated threshold value of branches 56b–c and the associated threshold value of branches 56c–d, then process circuitry 28 distinguishes target object 10 (FIG. 1) as being represented in the signals from sensor 22. Otherwise, process circuitry 28 evaluates the measurement type specified at one of measurement nodes 54b–g.

For example, if measurement #17 has a value between the associated threshold value of branches 56d–e and the associated threshold value of branches 56e–f, then process circuitry 28 evaluates measurement #47 of Appendix I specified at measurement node 54e. In such a situation, process circuitry 28 advantageously adapts to the recognition domain and saves processing time by traversing only branch 56e at the first level of decision tree 52, such that process circuitry 28 is not required to evaluate measurement types specified at nodes 54b,c,d,f and g. Likewise, if measurement #47 has a value between the associated threshold value of branches 58b–c and the associated threshold value of branches 58c–d, then process circuitry 28 traverses only branch 58c at the second level of decision tree 52, such that process circuitry 28 next evaluates measurement #0 of Appendix I specified at measurement node 54h.

Finally, if measurement #0 satisfies the associated threshold value between branches 60a–b, then process circuitry 28 traverses branch 60b at the third level of decision tree 52, such that process circuitry 28 distinguishes target object 12 (FIG. 1) as being represented in the signals from sensor 22. Otherwise, process circuitry 28 traverses branch 60a and distinguishes target object 15 (FIG. 1) as being represented in the signals. Thus, in distinguishing target object 15, process circuitry 28 traverses a path of decision tree 52 including nodes 54a, 54e, and 54h and branches 56e, 58c, and 60a.

As decision tree 52 of FIG. 5 demonstrates, process circuitry 28 is not required to always evaluate predefined types of acquired measurements. Instead, process circuitry 28 effectively adapts to a recognition domain by selecting measurements for evaluation according to each measurement's usefulness. For example, several types of measurements described in Appendix I are not specified in decision tree 52, such that process circuitry 28 is not required to spend processing time acquiring the non-specified types of measurements for evaluation. Further, process circuitry 28 is not required to spend processing time evaluating each of nodes 54a–i, because process circuitry 28 traverses only one branch at each level of decision tree 52. Accordingly, process circuitry 28 has relatively good efficiency and good robustness, because it evaluates measurements by adapting to the recognition domain rather than according to a preconceived recognition strategy.

Process circuitry 28 forms the n-ary decision tree by selecting measurement types for evaluation in an optimal order, thereby enhancing the efficiency with which process circuitry 28 eliminates uncertainty regarding an object's representation in the signals. In the preferred embodiment, process circuitry 28 selects the optimal order of measurement types in response to entropy of an object probability function. Entropy is one measure of uncertainty regarding an object's representation in the signals.

Process circuitry 28 estimates reduction in entropy by evaluating sample measurements acquired from a set of sample signals. Assuming n objects in the object set, process circuitry 28 establishes the a priori object entropy at a particular measurement node as $$H(X) = -\sum_{i=1}^{n} P(x_i) \log P(x_i) \qquad (1)$$

where H denotes entropy, where X denotes the object set ($X=[x_1 \ldots x_n]$) with $x_i$ denoting the ith element, and where P denotes object probability as a function of object $x_i$ conditioned on all measurement values satisfying the decision tree path from and including the root measurement node leading to but not including the particular measurement node.

For example, FIG. 6a is a first exemplary graph of object probability versus object type for five different types of objects in an object set. In the graph of FIG. 6a, object probability is distributed evenly among all objects of the object set. The maximum value of entropy occurs with each object having equal probability of being represented in the signals, as in FIG. 6a.

FIG. 6b is a second exemplary graph of object probability versus object type for five different types of objects. In the graph of FIG. 6b, object probability is concentrated solely at object #2, such that the minimum value of entropy (entropy= 0) occurs with object #2 having maximum probability (probability=1) of being represented in the signals.

Figure 7A:
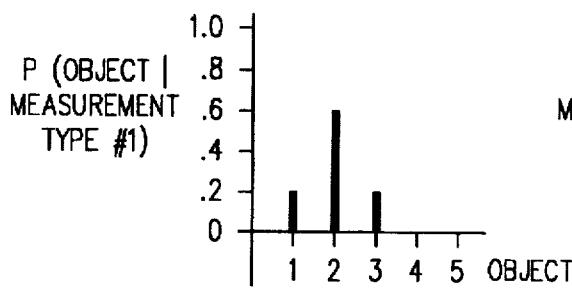
FIGS. 7a–c are exemplary graphs of object probability versus object type, conditioned on given values of different measurement types.
Figure 7B:
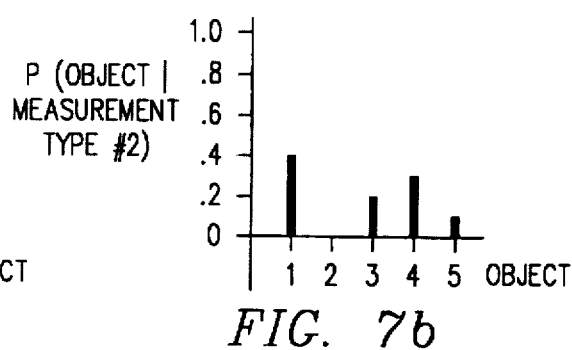
Figure 7C:
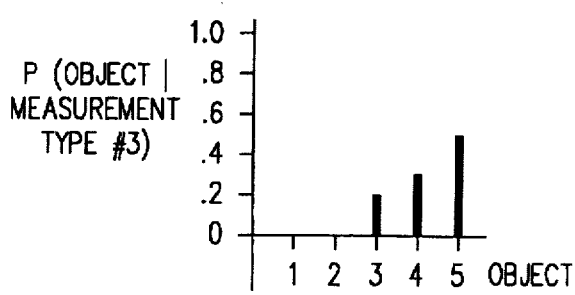

Without conditioning object probability on a given value of any particular measurement type being considered by process circuitry 28 for selection to be specified at a particular measurement node, the graph of FIG. 6a shows object probability versus object type (for five different types of objects) where each object has equal probability of being represented in the signals. By comparison, the exemplary graph of FIG. 7a shows object probability versus object type, conditioned on a given value of a hypothetical measurement type #1. Similarly, the exemplary graph of FIG. 7b shows object probability versus object type, conditioned on a given value of a hypothetical measurement type #2. The exemplary graph of FIG. 7c shows object probability versus object type, conditioned on a given value of a hypothetical measurement type #3.

After process circuitry 28 conditions the object entropy on a sample measurement value y, the object entropy at a particular measurement node becomes $$H(X|y) = -\sum_{i=1}^{n} P(x_i|y) \log P(x_i|y) \quad (2)$$

where y denotes a sample measurement value of a particular measurement type, and where $P(x_i|y)$ denotes object probability as a function of object $x_i$ conditioned on the sample measurement value y and additionally conditioned on all measurement values satisfying the decision tree path from and including the root measurement node leading to the particular measurement node.

The actual reduction in uncertainty is measured by $$I(X;Y) = E[H(X) - H(X|y)] \quad (3)$$

where process circuitry 28 obtains the expectation by averaging over the sample space of possible measurement values Y, and where I (X;Y) is the average mutual information between the sample measurements and the objects to be distinguished. Average mutual information measures reduction in entropy averaged over possible measurement values for a particular measurement type.

In response to differences in entropy resulting from conditioning object probability on given values of different measurement types in a measurement set (such as the differences in entropy exhibited by the exemplary graphs of FIGS. 7a–c), process circuitry 28 selects an optimal measurement type for evaluation at a measurement node of the n-ary decision tree. As a simple example, based only on the measurement values in the exemplary graphs of FIGS. 7a–c, the optimal measurement type for evaluation is hypothetical measurement type #1, because the graph of FIG. 7a exhibits the highest concentration of probability and hence the highest reduction in entropy. Thus, in response only to object probabilities shown by the exemplary graphs of FIGS. 7a–c, process circuitry 28 would select hypothetical measurement type #1 for evaluation at a measurement node of the n-ary decision tree. In actual practice, process circuitry 28 considers all measurement values, as indicated in Equation (3).

Similarly, process circuitry 28 evaluates the reduction in entropy to estimate whether an entire set of selected measurements is sufficient to distinguish each object of an object set with a specified reliability. Process circuitry 28 estimates the sufficiency of selected measurements in a manner independent of a preconceived recognition strategy. By making such an estimation, process circuitry 28 likewise estimates its own reliability in distinguishing objects.

In forming a decision tree (such as decision tree 52), process circuitry 28 estimates reduction in entropy by evaluating sample measurements acquired from a set of sample signals. Similarly, process circuitry 28 estimates its actual reliability in distinguishing each object represented in actual signals, by determining its sample reliability in distinguishing each object represented in the set of sample signals.

Figure 8:
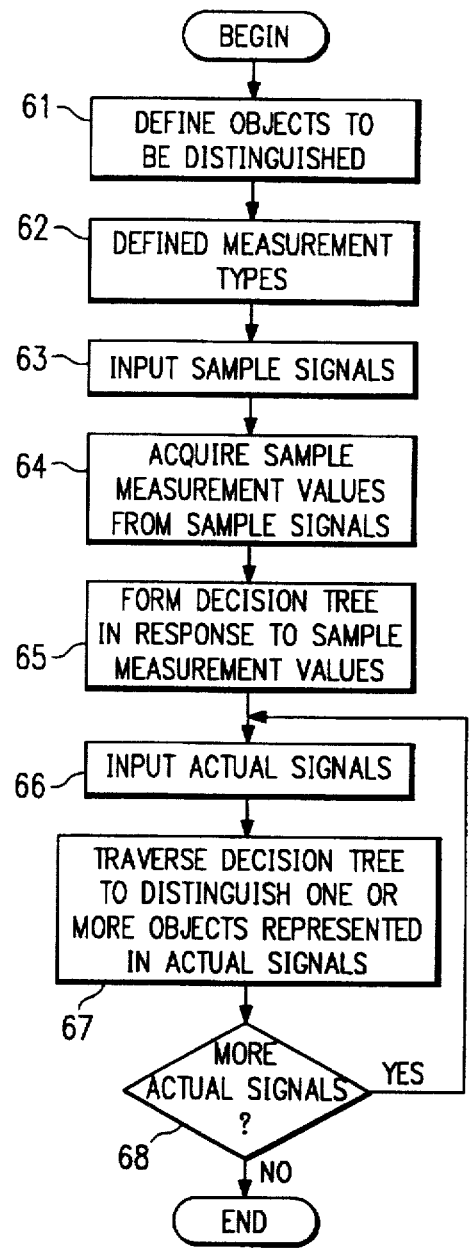
FIG. 8 is a flow chart of the technique of the preferred embodiment by which process circuitry of FIG. 3 forms an n-ary decision tree.

FIG. 8 is a flow chart of the technique of the preferred embodiment by which process circuitry 28 forms an n-ary decision tree in response to a set of sample signals representing all objects to be distinguished in an object set. At step 61, process circuitry 28 inputs definitions of a set of objects (such as set 20 of FIG. 1) to be distinguished as being either represented or not represented in the actual signals. At step 62, process circuitry 28 inputs definitions of a set of measurement types (such as the set of measurement types described in Appendix I) that are characteristic, to varying degrees, of one or more of the objects to be distinguished. At step 63, process circuitry 28 inputs a set of sample signals.

For example, at step 63, process circuitry 28 can input a set of 500 sample images (such as image 44 of FIG. 4a) of target objects 0–19 (FIG. 1), such that each of target objects 0–19 is represented in an average of twenty-five sample images. If each of target objects 0–19 is proportionately represented in exactly twenty-five sample images, then process circuitry 28 treats each of target objects 0–19 as having equal initial probability of being represented the actual signals (maximum entropy). If any of target objects 0–19 is represented in a disproportionate number of sample images, then process circuitry 28 adjusts the initial probabilities, according to the ratios with which target objects 0–19 are represented in the set of sample images. Within the set of sample images, a sample image representing a particular target object can be duplicated as desired in order to reflect the particular target object's increased initial probability of being represented in the actual signals.

Preferably, the set of sample signals represents each object under a variety of actual conditions. For example, each of target objects 0–19 is preferably represented in multiple sample images under a variety of different actual viewing conditions, such as varying orientations, lighting conditions, distances and backgrounds. Since process circuitry 28 estimates its actual reliability by determining its sample reliability, the actual reliability of process circuitry 28 is sufficiently estimated where the set of sample signals is sufficiently representative of actual signals.

After inputting the set of sample signals, process circuitry 28 acquires sample measurements from the set of sample signals at step 64. For example, if process circuitry 28 at step 63 inputs a set of 500 sample images (such as image 44 in FIG. 4a of target object 12 in FIG. 1) of target objects 0–19, then process circuitry 28 at step 64 would acquire a sample measurement from each of the 500 sample images for each type of measurement 0–148 (Appendix I), such that 500 sample measurements are acquired for each type of measurement 0–148. Moreover, at step 64, the sample measurements are classified according to object type. For example, if each of target objects 0–19 is proportionately represented in exactly twenty-five sample images, then for each type of target object 0–19 twenty-five sample measurements are acquired for each type of measurement 0–148.

At step 65, process circuitry 28 forms an n-ary decision tree (such as decision tree 52 of FIG. 5) in response to the sample measurement values acquired at step 64. The technique of the preferred embodiment by which process circuitry 28 forms the n-ary decision tree at step 65 is described further hereinbelow in connection with FIGS. 9–14.

After forming the decision tree, process circuitry 28 inputs actual signals at step 66. At step 67, process circuitry 28 traverses the decision tree to distinguish one or more objects represented in the actual signals, according to the technique described further hereinabove in connection with FIG. 5. After traversing the decision tree, process circuitry 28 determines at decision block 68 whether to process more actual signals. If more actual signals are to be processed, then execution returns to step 66; otherwise, execution stops.

In forming the decision tree at step 65, it is frequently impractical for process circuitry 28 to require that the decision tree resolve all uncertainty in object identity. It is frequently practical for process circuitry 28 to accept some uncertainty in object identity.

Accordingly, in order to identify an object as being distinguished at a branch of a particular measurement node, it is frequently practical for process circuitry 28 to require that there is an i such that $$P(X_i|y) > C \qquad (4)$$

where C is a specified reliability of distinguishing the object, and where sample measurement vector y contains all measurement values satisfying the decision tree path from and including the root measurement node leading to and including the particular measurement node.

Alternatively, process circuitry 28 can require that $$\frac{H(X|y)}{H(X)} < \epsilon \qquad (5)$$

where $\epsilon$ represents the allowable uncertainty.

In yet another alternative, process circuitry 28 can require that $$H(X|y) > \epsilon \qquad (6)$$

For discretely variable measurements, process circuitry 28 calculates mutual information I(X;Y) by collecting sample measurement values for each of the n objects X=[$x_1$ ... $x_n$], and by using estimated (instead of exact) probabilities to estimate the entropies found in the expression for mutual information (Equation (3)).

Where process circuitry 28 considers selecting a continuously variable measurement to be specified at a particular measurement node of the decision tree, process circuitry 28 exploits the symmetry of mutual information, namely I(X;Y)=I(Y;X), such that $$I(Y;X) = -\int_{-\infty}^{\infty} p(y)\log p(y)dy + \sum_{i=1}^{n} P(x_i) \int_{-\infty}^{\infty} p(y|x_i)\log p(y|x_i)dy \qquad (7)$$

where p(y) denotes a probability density function estimate for a particular measurement value of a particular measurement type, and where p(y|$x_i$) denotes a probability density function estimate for a particular measurement value of a particular measurement type conditioned on a particular object $x_i$.

Accordingly, process circuitry 28 estimates mutual information by obtaining sample measurement values for each object $x_i$, and by using a probability density estimator to estimate p(y|$x_i$). The probability density function estimates p(y) and p(y|$x_i$) are additionally conditioned on all measurement values satisfying the decision tree path from and including the root measurement node leading to the particular measurement node. In the preferred embodiment, process circuitry 28 uses any suitable numerical integration technique to estimate integrals of Equation (7). In practice, process circuitry 28 normally does not need to integrate over the full range from $-\infty$ to $\infty$ in Equation (7), but instead process circuitry 28 normally can integrate over a limited range.

Significantly, not all measurement types are necessarily relevant to distinguishing [$x_1$ ... $x_n$]. Further, some measurement types are possibly redundant with respect to information provided by other measurement types. Accordingly, process circuitry 28 accounts for redundant or irrelevant measurement types by recursively selecting measurements for evaluation at measurement nodes of an n-ary decision tree.

If a decision tree is not formed by process circuitry 28 in advance of inputting signals from sensor 22, then a significant performance penalty results. As illustrated in FIG. 8, process circuitry 28 preferably forms an n-ary decision tree (such as decision tree 52 of FIG. 5) at step 65 in advance of the time when objects are to be distinguished. At step 65, the measurement selected by process circuitry 28 for evaluation at a particular measurement node is that which provides the highest estimated mutual information in consideration of a decision tree path. As described hereinabove in connection with FIG. 5, a decision tree path includes all measurements and branches in a decision tree from and including the decision tree's root measurement node leading to the particular measurement node.

After selecting a measurement for evaluation at a particular measurement node, process circuitry 28 determines at a particular branch whether an i exists such that P($x_i$|measurement values satisfying decision tree path)>C, where C is the specified reliability of distinguishing objects. Thus, process circuitry 28 determines an optimal sequence of measurements for evaluation in order to achieve the specified reliability C.

Figure 9:
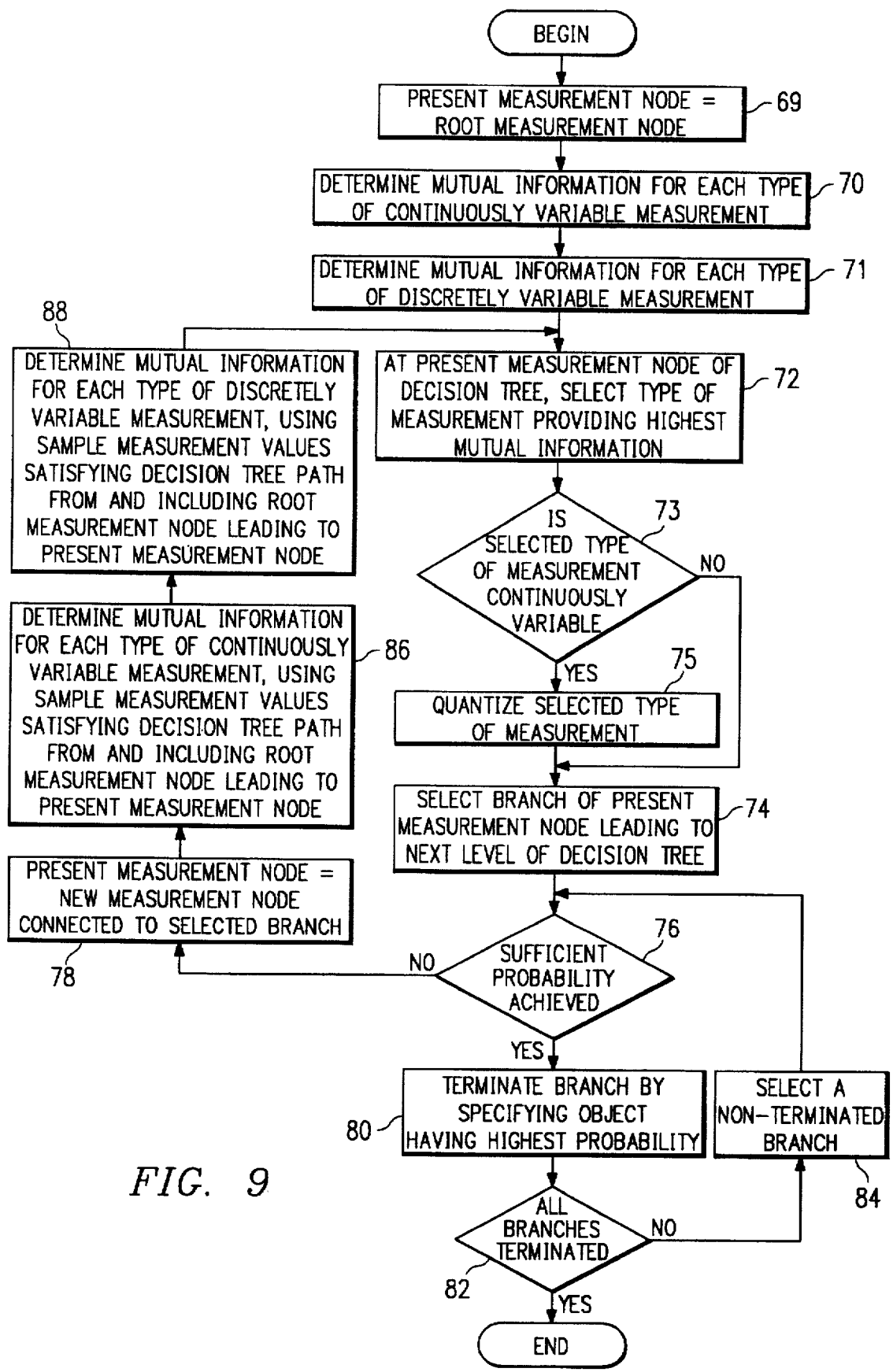
FIG. 9 is a flow chart of the technique of the preferred embodiment by which process circuitry of FIG. 3 recursively selects measurements for evaluation at measurement nodes of an n-ary decision tree.

FIG. 9 is a flow chart of the technique of the preferred embodiment by which process circuitry 28 recursively selects measurements for evaluation at measurement nodes of an n-ary decision tree. Execution begins at step 69, where process circuitry 28 initializes a present measurement node indicator to indicate the decision tree's root measurement node (such as root measurement node 54a of FIG. 5). At step 70, process circuitry 28 determines the mutual information provided by each type of continuously variable measurement. At step 71, process circuitry 28 determines the mutual information provided by each type of discretely variable measurement. At step 72, process circuitry 28 selects a measurement type for evaluation at the present measurement node, such that the selected measurement type provides the highest mutual information (as most recently determined by process circuitry 28) relative to each of the non-selected measurement types.

At decision block 73, process circuitry 28 determines whether the selected measurement type is continuously variable. If the selected measurement type is not continuously variable, then execution continues to step 74. If the selected measurement type is continuously variable, then process circuitry 28 quantizes the selected measurement at step 75 according to the technique of the preferred embodiment described further hereinbelow in connection with FIGS. 10–14, and execution continues to step 74.

At step 74, process circuitry 28 selects any branch of the present measurement node. By definition, the selected branch leads to the next level of the decision tree. At decision block 76, process circuitry 28 determines whether the specified reliability C is achieved at the selected branch. If the specified reliability C is not achieved at the selected branch, then execution continues to step 78. If the specified reliability C is achieved at the selected branch, then at step 80 process circuitry 28 terminates the selected branch by specifying the object type having the highest probability of being represented in the signals.

At decision block 82, process circuitry 28 determines whether all branches of the decision tree have been terminated. If all branches of the decision tree have been terminated, then execution ends. If all branches of the decision tree have not been terminated, then at step 84 process circuitry 28 selects a non-terminated branch, and execution returns to decision block 76.

At step 78, process circuitry 28 updates the present measurement node indicator to indicate a new measurement node connected to the selected branch. At step 86, process circuitry 28 determines the mutual information provided by each type of continuously variable measurement, using sample measurement values satisfying a decision tree path from and including the root measurement node leading to the present measurement node. At step 88, process circuitry 28 determines the mutual information provided by each type of discretely variable measurement, using sample measurement values satisfying a decision tree path from and including the root measurement node leading to the present measurement node. Execution then returns to step 72.

In this manner, selection of measurements for evaluation continues until the specified reliability C is achieved. Process circuitry 28 does not select irrelevant or redundant measurement types for evaluation at measurement nodes, resulting in successful pruning of measurement types for evaluation. Accordingly, process circuitry 28 achieves data driven dimensionality reduction and operates at high efficiency, because process circuitry 28 does not need to acquire all measurements from the signals in order to distinguish one or more objects in the set of objects.

Moreover, under the technique of FIG. 9, process circuitry 28 determines mutual information provided by each type of continuously variable measurement. Then, process circuitry 28 selects the measurement type providing the highest mutual information relative to each of the non-selected measurement types. Under this approach of the preferred embodiment, process circuitry 28 advantageously quantizes only those continuously variable measurements which are selected for evaluation at measurement nodes of the decision tree. Thus, process circuitry 28 efficiently forms the decision tree, without having to quantized those continuously variable measurements that are not selected for evaluation at measurement nodes of the decision tree.

Alternatively, process circuitry 28 can initially quantize all continuously variable measurements, so that process circuitry 28 could determine mutual information provided by each of the resulting types of quantized measurements. In such an alternative approach, process circuitry 28 selects the quantized measurement type providing the highest mutual information relative to each of the non-selected measurement types. By forming the decision tree in response to mutual information provided by quantized measurement types, process circuitry 28 reflects the fact that it subsequently traverses the decision tree by evaluating measurements in a quantized manner. Accordingly, it is possible that such an alternative approach might provide a slightly more optimal ordering of measurements for evaluation within the decision tree.

Nevertheless, such an alternative approach is not preferred because process circuitry 28 uses additional processing time to quantized all continuously variable measurements at each new node of the decision tree, even those continuously variable measurements that are not selected for evaluation at measurement nodes of the decision tree. Also, if a first quantized measurement ("QM1") is formed by quantizing a first continuously variable measurement ("CM1"), if a second quantized measurement ("QM2") is formed by quantizing a second continuously variable measurement ("CM2"), and if QM1 provides more mutual information than QM2, then it is unlikely that CM1 will provide less mutual information than CM2.

Process circuitry 28 forms an n-ary decision tree (such as decision tree 52 of FIG. 5), such that process circuitry 28 is able to consider more than two possible values of a discretely variable measurement type or a quantized continuously variable measurement type at a single node (such as measurement node 54a). Thus, process circuitry 28 efficiently uses available system memory, and consumes relatively small processing time in evaluating acquired measurements by traversing a path of an n-ary decision tree of the preferred embodiment.

In forming the n-ary decision tree, process circuitry 28 advantageously selects a suitable number of branches at each measurement node by adapting to a recognition domain. For example, process circuitry 28 forms decision tree 52 with seven branches 56a–g associated with measurement node 54a, and with four branches 58a–d associated with measurement node 54e. Moreover, process circuitry 28 advantageously selects suitable threshold values associated with such branches by adapting to the recognition domain.

Accordingly, process circuitry 28 advantageously quantizes continuous measurement types into discrete measurement types. For a measurement type selected for evaluation at a measurement node, process circuitry 28 chooses the number of associated branches ("quantization intervals") in a manner consistent with the mutual information provided by the selected measurement type. Process circuitry 28 chooses a small number of quantization intervals for measurements yielding a small amount of mutual information, and chooses a large number of quantization intervals for measurements yielding a large amount of mutual information.

Moreover, process circuitry 28 performs quantization such that mutual information is optimized for the chosen number of quantization intervals. Accordingly, process circuitry 28 estimates mutual information as a continuously variable function of threshold values. For m quantization intervals, process circuitry 28 determines m−1 ordered associated threshold values which optimize the estimated mutual information function. In the preferred embodiment, process circuitry 28 uses the downhill simplex method (modified to preserve the order of thresholds) for such multidimensional optimization, because it does not require that derivatives be evaluated or that the estimated mutual information function be differentiable.

In selecting m, process circuitry 28 follows two guidelines. First, process circuitry 28 recovers mutual information efficiently with respect to m. For example, if m=4 yields 2 bits of mutual information, and if m=8 yields 2.1 bits of mutual information, then the choice of m=8 is not preferred. This is because the decision tree would occupy significant additional memory for only a marginal increase in mutual information, and also because each succeeding subtree would have access to an average of only half as much data for its formation. Second, process circuitry 28 performs quantization with respect to m, such that m is consistent with the amount of mutual information provided. In this manner, m is sufficiently large to avoid an unnecessarily large number of levels in the decision tree. By comparison, the large number of levels in a binary decision tree results in slow performance.

Figure 10:
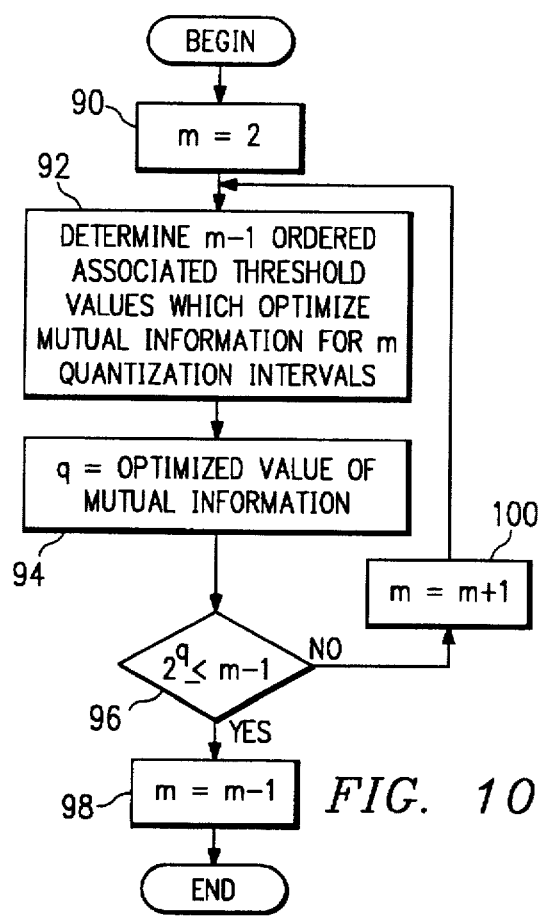
FIG. 10 is a flow chart of the technique of the preferred embodiment by which process circuitry of FIG. 3 selects a number of quantization thresholds and associated threshold values at a measurement node of an n-ary decision tree.

FIG. 10 is a flow chart of the technique by which process circuitry 28 selects m, together with the m−1 ordered associated threshold values. At step 90, process circuitry 28 sets m=2. At step 92, process circuitry 28 determines m−1 ordered associated threshold values which optimize mutual information for m quantization intervals. At step 94, process circuitry 28 sets q to equal the optimized value of mutual information from step 92. Decision block 96 determines whether $2^q \leq m-1$. If decision block 96 determines that $2^q \leq m-1$, then at step 98 process circuitry 28 sets m=m−1, and execution stops. If decision block 96 determines that $2^q > m-1$, then at step 100 process circuitry 28 sets m=m+1, and execution returns to step 92.

The technique of FIG. 10 is efficient with respect to m, because process circuitry 28 increases m only until mutual information slows its growth with respect to m. Notably, a measurement can be specified for evaluation at multiple measurement nodes in the decision tree, so that process circuitry 28 is not required to extract all mutual information at a single measurement node via numerous quantization intervals. Moreover, this technique is opportunistic, because measurements yielding high mutual information result in high values for m.

Figure 11:
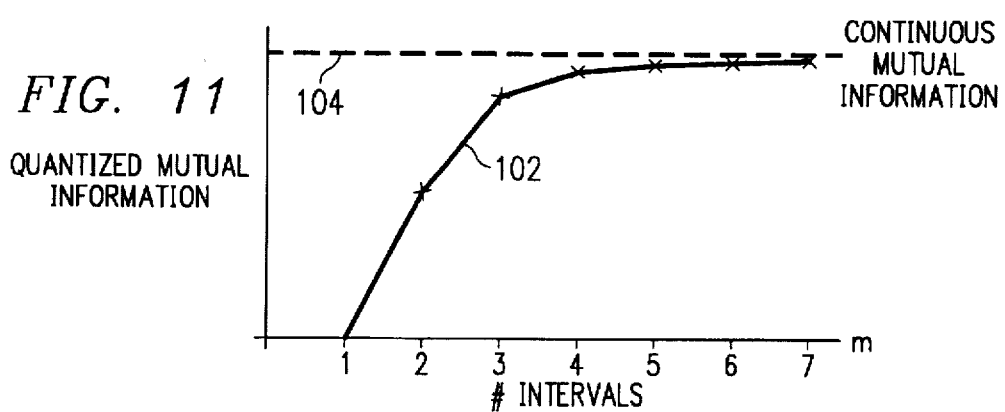
FIG. 11 is an exemplary graph of quantized mutual information.

FIG. 11 is an exemplary graph of quantized mutual information, showing how quantized mutual information typically grows as the number m of quantization intervals increases. As m increases, quantized mutual information curve 102 asymptotically approaches continuous mutual information level 104.

Process circuitry 28 automatically selects optimal measurements for evaluation, such that the recognition strategy is adapted to the recognition domain. More particularly, process circuitry 28 autonomously selects measurements for evaluation by adapting to properties of the sample measurement data when estimating probability densities for mutual information estimation and quantization of continuously variable measurements.

Advantageously, process circuitry 28 does not determine mutual information over an entire measurement vector. Thus, process circuitry 28 is not required to estimate multidimensional probability densities. Instead, process circuitry 28 determines mutual information between a single measurement $y_j$ and the objects to be distinguished. This approach simplifies the computational requirements of process circuitry 28, since only one-dimensional probability densities are estimated.

Unlike the situation where a measurement is discretely variable, for a continuously variable measurement it is impractical to estimate object probabilities conditioned on each possible measurement value. Instead, process circuitry 28 estimates probability densities of continuously variable measurements conditioned on objects to be distinguished, as specified in Equation (7). Since sample measurement data are arbitrary, process circuitry 28 does not assume a predetermined model for the probability densities. Instead, process circuitry 28 implements an adaptive nonparametric density estimation technique.

A standard nonparametric density estimation technique is the Parzen technique, which superimposes kernel functions on the sample measurement data, where the kernel functions correspond to legitimate probability density functions. Commonly, the Parzen technique uses a Gaussian kernel function. In the Parzen technique, the mean of the sample measurement data agrees with the mean of the corresponding Parzen probability density estimate.

As a number of sample measurement data points approaches infinity, the Parzen technique results in an estimate guaranteed to converge to the actual density function, independently of the initial kernel size (typically measured by standard deviation σ of the Gaussian). Nevertheless, practicality imposes limits on the number of sample measurement data points. Thus, kernel size is significant, because kernel size frequently determines the smoothness and resolution of the probability density estimate for finite sample measurement data.

For finite sample measurement data, a significant shortcoming of the Parzen technique is its inability to automatically and objectively choose σ so that first and second order characteristics of the sample measurement data agree with first and second order characteristics of the estimated probability density function. Initially, σ is manually chosen under the Parzen technique according to a cumbersome and subjective process of iteration. Moreover, under the Parzen technique, the size of each kernel is identical, which less accurately estimates proprobability density when sample measurement data is limited.

In the preferred embodiment, process circuitry 28 advantageously forms smooth probability density estimates having large σ when adapting to a few sample measurement data points, in order to realistically and accurately reflect lack of knowledge. Conversely, process circuitry 28 advantageously forms sharp probability density estimates having small σ when adapting to numerous sample measurement data points.

Accordingly, in a significant aspect of the preferred embodiment, process circuitry 28 adaptively chooses σ in response to the sample measurement data. In forming an adaptive probability density estimate, process circuitry 28 automatically and objectively chooses σ so that first and second order characteristics of the sample measurement data agree with first and second order characteristics of the estimated probability density function. Moreover, process circuitry 28 individually chooses σ for each kernel, such that probability density is accurately estimated when sample measurement data is limited.

The difference between the sample measurement data variance and the probability density estimate variance is $\sigma^2$ for uniform kernel sizes. Thus, process circuitry 28 does not require exact agreement, because exact agreement would indicate σ=0. Instead, process circuitry 28 specifies a maximum allowable difference between the sample measurement data variance and the probability density estimate variance. Process circuitry 28 specifies the maximum allowable difference as being the root mean squared error in the variance estimate obtained from the sample measurement data. By choosing σ such that the maximum allowable difference is attained, process circuitry 28 effectively chooses the smoothest probability density estimate consistent with second order characteristics of the sample measurement data.

For unbiased sample measurement data, the variance estimate obtained from n sample measurement data points $[x_1 \ldots x_n]$ is $$\hat{V} = \frac{1}{n} \sum_{i=1}^{n} x_i^2 \qquad (8)$$

Process circuitry 28 sets the maximum allowable kernel variance to equal the root mean squared error in the variance estimate obtained from the sample measurement data. Thus, the maximum allowable average of kernel variances is $$\sqrt{E(\hat{V} - V)^2} = \sqrt{\frac{1}{n^3} [\overline{x^4}(n^2 - 2n + 1) - \overline{x^2}^2(n^2 - 5n + 3)]} \qquad (9)$$

Accordingly, process circuitry 28 sets the maximum value of σ to $$\sqrt[4]{\frac{1}{n^3} [\overline{x^4}(n^2 - 2n + 1) - \overline{x^2}^2(n^2 - 5n + 3)]} \qquad (10)$$

In the above expression, quantities estimated from the sample measurement data replace the expected values. In this manner, σ advantageously varies with the amount of sample measurement data.

Accordingly, in the preferred embodiment, process circuitry 28 forms a probability density estimate that is globally consistent with first and second order characteristics of the sample measurement data. Moreover, process circuitry 28 advantageously imposes local neighborhood consistency on the adaptive probability density estimate. More particularly, process circuitry 28 adapts $\sigma$ in response to local properties of the sample measurement data. In comparison to a typical Parzen estimation technique, process circuitry 28 allows non-uniform kernel sizes, which is advantageous for estimating multi-modal densities.

By allowing non-uniform kernel sizes, the difference between the sample measurement data variance and the probability density estimate variance is the average variance of the kernels as indicated in $$\left( \frac{1}{n} \sum_{i=1}^{n} \sigma_i^2 \right) \quad (11)$$

Accordingly, process circuitry 28 chooses $\sigma_i$ (corresponding to data point i) in response to local structure of the data, such that the maximum allowable value of the average kernel variance is $$\sqrt{E(\overline{V}-V)^2} = \sqrt{\frac{1}{n^3} [\overline{x^4}(n^2 - 2n + 1) - \overline{x^2}(n^2 - 5n + 3)]} \quad (12)$$

In order to respond to the local second order characteristics of the data, process circuitry 28 uses a K-nearest approach for determining $\sigma_i$. Accordingly, process circuitry 28 establishes $\sigma_i$ equal to the $\sigma$ of data points in the local neighborhood of data point i. The local neighborhood of data point i includes the K data points nearest to data point i, where K is an integer variable. It is unlikely that a K will exist yielding equality in the above expression. As K increases from 1 to n−1, the average kernel variance increases. In the preferred embodiment, process circuitry 28 implements a bisection search to efficiently determine the maximum K satisfying $$\frac{1}{n} \sum_{i=1}^{n} \sigma_i^2 \leq \sqrt{\frac{1}{n^3} [\overline{x^4}(n^2 - 2n + 1) - \overline{x^2}(n^2 - 5n + 3)]} \quad (13)$$

Figure 12A:
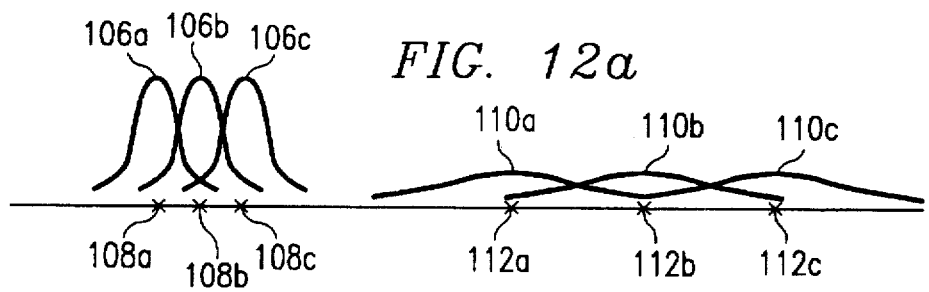
FIG. 12a is an exemplary plot of kernels selected by process circuitry of FIG. 3.
Figure 12B:
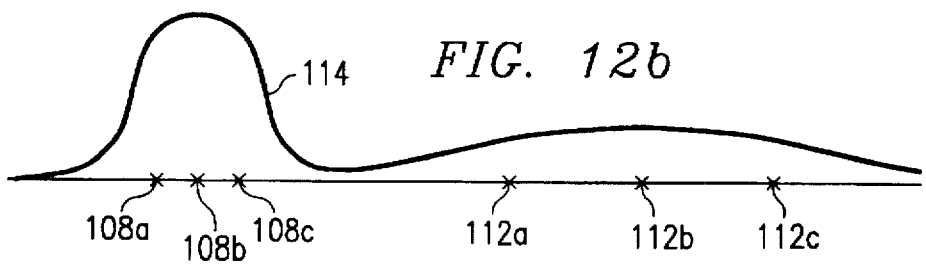
FIG. 12b is a plot of a probability density function estimate formed by combining kernels of FIG. 12a into a single continuous curve.

FIG. 12a is an exemplary plot, where K=1, of kernels 106a–c respectively selected by process circuitry 28 in response to sample measurement data points 108a–c, and of kernels 110a–c respectively selected by process circuitry 28 in response to sample measurement data points 112a–c. FIG. 12b is a plot of a probability density function estimate formed by combining kernels 106a–c and 110a–c into a single continuous curve 114.

As FIGS. 12a–b illustrate, by choosing $\sigma_i$ according to the preferred embodiment, process circuitry 28 adapts to the recognition domain by adapting to the sample measurement data. More particularly, process circuitry 28 provides a probability density estimate globally consistent with first and second order characteristics of the sample measurement data, and locally consistent with second order characteristics of the sample measurement data. Kernels 110a–c together form a smooth probability density estimate having large $\sigma$ by adapting to a few widely distributed sample measurement data points 112a–c. Conversely, kernels 106a–c together form a sharp probability density estimate having small $\sigma$ by adapting to closely concentrated sample measurement data points 108a–c.

Figure 13A:
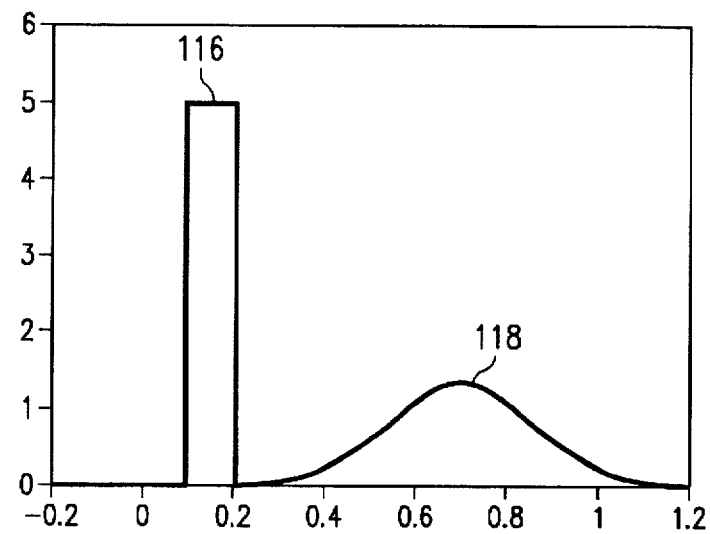
FIG. 13a is a plot of a probability density curve.
Figure 13B:
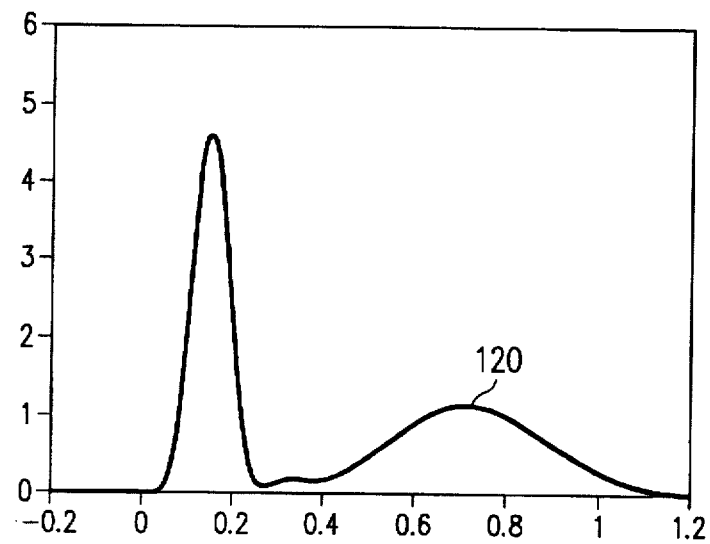
FIG. 13b is a plot of a continuous probability density curve representing a probability density function estimated by process circuitry of FIG. 3.

FIG. 13a is a plot of a theoretical probability density curve having a uniform probability density component 116, and having a Gaussian probability density component 118. FIG. 13b is a plot of a continuous probability density curve 120 representing a probability density function estimated by process circuitry 28 according to the technique of the preferred embodiment. Process circuitry 28 estimated the probability density function of curve 120 by adapting to one-hundred sample measurement data points randomly generated from the uniform component 116 and the Gaussian component 118. As FIGS. 13a–b illustrate, the probability density function of curve 120 estimated by process circuitry 28 advantageously achieves a close correlation with the theoretical probability density curve of FIG. 13a, in response to only a limited number of one-hundred sample measurement data points.

Figure 14A:
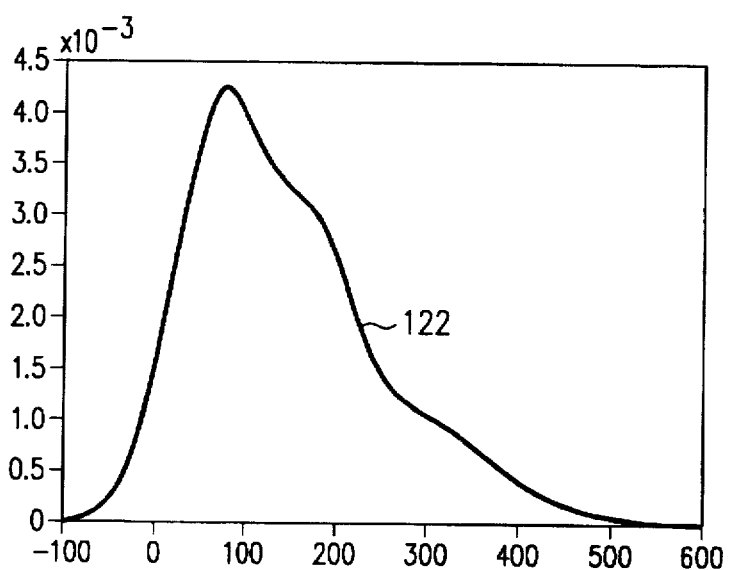
FIGS. 14a–b are plots of continuous probability density curves representing probability density functions estimated by process circuitry of FIG. 3.
Figure 14B:
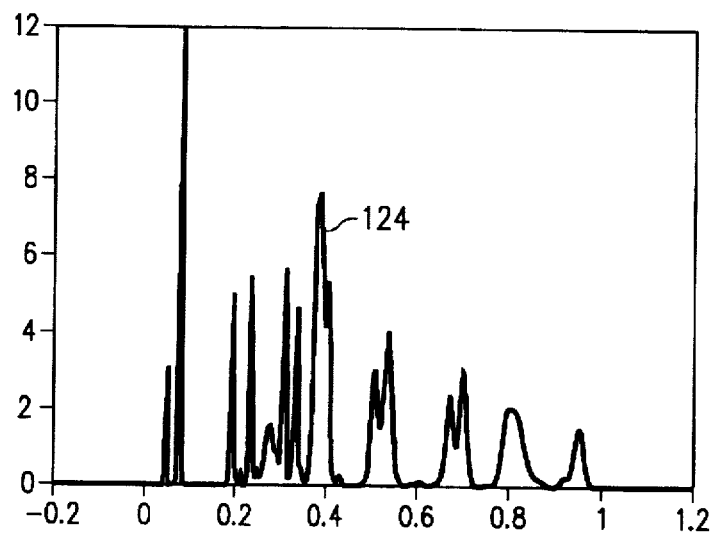

FIG. 14a is a plot of a continuous probability density curve 122 representing a probability density function that process circuitry 28 estimated for measurement #2 (Appendix I) by adapting to five-hundred sample measurement data points acquired by process circuitry 28 from five-hundred sample images. FIG. 14b is a plot of a continuous probability density curve 124 representing a probability density function that process circuitry 28 estimated for measurement #17 (Appendix I) by adapting to five-hundred sample measurement data points acquired by process circuitry 28 from five-hundred sample images.

Curve 122 of FIG. 14a illustrates a relatively smooth probability density estimate having large average $\sigma$. Conversely, curve 124 of FIG. 14b illustrates a sharp probability density estimate having small average $\sigma$ reflecting highly distinguishing characteristics of the sample measurement data acquired for measurement #17 (Appendix I). This highly distinguishing character of measurement #17 is acknowledged in decision tree 52 (FIG. 5) by measurement #17 being specified for evaluation at root measurement node 54a.

In this manner, process circuitry 28 provides a sufficiently accurate estimate of an acquired measurement's probability sp having a value within a specified range. The probability density function estimate provided by process circuitry 28 is useful in any application that benefits from a probabilistic characterization of at least one random variable in response to samples of the random variable. For example, a manufacturer of a product (such as a resistor) can manufacture samples of the product and then measure the product's performance (such as the resistor's resistance). With the probability density function estimate provided by process circuitry 28, quality assurance personnel can determine a statistical tolerance for quotation to customers as a product specification, such as a percentage likelihood that the product's performance will fall within a specified range. In a similar manner, with the probability density function estimate provided by process circuitry 28 in response to a limited number of data samples, numerous engineering and physical science applications can estimate likelihood of an occurrence such as automotive engine performance and geophysical conditions.

In a test, process circuitry 28 achieved approximately 97% reliability in distinguishing target objects 0–19 (FIG. 1) as being either represented or not represented in a set of 19,500 sample images. Process circuitry 28 successfully distinguished each object by traversing a path of an n-ary decision tree formed by process circuitry 28 according to the preferred embodiment. In traversing a path of the n-ary decision tree, process circuitry 28 evaluated selected types of measurements 0–148 (Appendix I) acquired from the set of 19,500 sample images, as specified at nodes of the n-ary decision tree. Process circuitry 28 used an average of approximately 0.38 seconds to distinguish an object by traversing a path of the n-ary decision tree.

Although the present invention and its advantages have been described in detail, it should be understood that various changes, substitutions and alterations can be made herein without departing from the spirit and scope of the invention as defined by the appended claims.

APPENDIX I

| | Exemplary Measurements from an Image |
|---|---|
| 0 | Minimum x coordinate of smallest possible rectangle ("rectangle") containing largest connected set of pixels ("pixel set") |
| 1 | Maximum x coordinate of rectangle |
| 2 | Minimum y coordinate of rectangle |
| 3 | Maximum y coordinate of rectangle |
| 4 | Width of rectangle |
| 5 | Height of rectangle |
| 6 | Area of rectangle, as measured by Measurement #4 multiplied by Measurement #5 |
| 7 | Aspect ratio of rectangle, as measured by ratio between Measurement #4 and Measurement #5, or inverted ratio if larger |
| 8 | Area of pixel set, as measured by number of pixels in pixel set |
| 9 | Summation of (x coordinate)$^2$ for each pixel in pixel set |
| 10 | Summation of (x coordinate) · (y coordinate) for each pixel in pixel set |
| 11 | Summation of (y coordinate)$^2$ for each pixel in pixel set |
| 12 | x coordinate of center of area ("centroid") of pixel set |
| 13 | y coordinate of centroid |
| 14 | Bounding efficiency, as measured by Measurement #8 divided by Measurement #6 |
| 15 | Minimum second moment of inertia of pixel set around a line through centroid |
| 16 | Maximum second moment of inertia of pixel set around a line through centroid |
| 17 | 1/eccentricity, as measured by Measurement #15 divided by Measurement #16 |
| 18 | Major axis orientation, as measured by angle relative to the x-axis of the line through the centroid resulting in minimum second moment of inertia |
| 19 | Cosine of major axis orientation relative to x axis |
| 20 | Sine of major axis orientation relative to x axis |
| 21 | Perimeter of pixel set |
| 22 | Relative to a prime coordinate frame having an origin at centroid and having an x axis orientation coincident with the major axis orientation, the maximum x coordinate ("x'$_{max}$") of pixel set |
| 23 | Relative to prime coordinate frame, minimum x coordinate ("x'$_{min}$") of pixel set |
| 24 | Relative to prime coordinate frame, maximum y coordinate ("y'$_{max}$") of pixel set |
| 25 | Relative to prime coordinate frame, minimum y coordinate ("y'$_{min}$") of pixel set |
| 26 | Minimum distance of a pixel on the perimeter of pixel set away from origin of prime coordinate frame |
| 27 | Maximum distance of a pixel on the perimeter of pixel set away from origin of prime coordinate frame |
| 28 | Compactedness, as measured by deviation of the pixel set from a circle, more specifically 4π multiplied by (Measurement #8) and divided by (Measurement #21)$^2$ |
| 29 | Ratio between | Measurement #22 | and | Measurement #23 |, or inverted ratio if smaller |
| 30 | Ratio between | Measurement #24 | and | Measurement #25 |, or inverted ratio if smaller |
| 31 | Oriented width, as measured by Measurement #22 minus Measurement #23 |
| 32 | Oriented height, as measured by Measurement #24 minus Measurement #25 |
| 33 | Oriented bounding area, as measured by Measurement #31 multiplied by Measurement #32 |
| 34 | Oriented bounding efficiency, as measured by Measurement #8 divided by Measurement #33 |

APPENDIX I-continued

| | Exemplary Measurements from an Image |
|---|---|
| 35 | Aspect ratio of rectangle, relative to prime coordinate frame |
| 36 | Oriented dimensions ratio, as measured by Measurement #31 divided by Measurement #32 |
| 37 | Oriented width aspect ratio, as measured by (Measurement #31)$^2$ divided by Measurement #8 |
| 38 | Oriented height aspect ratio, as measured by (Measurement #32)$^2$ divided by Measurement #8 |
| 39 | Minimum radius aspect ratio, as measured by (2 · Measurement #26)$^2$ divided by Measurement #8 |
| 40 | Maximum radius aspect ratio, as measured by (2 · Measurement #27)$^2$ divided by Measurement #8 |
| 41 | Radius ratio, as measured by Measurement #26 divided by Measurement #27 |
| 42 | Angle trace area, as measured by an area swept by a maximum radius vector, where the maximum radius vector extends from the prime coordinate frame's origin to a pixel of the pixel set farthest from the prime coordinate frame's origin, as the maximum radius vector sweeps from 0° through 360° relative to the prime coordinate frame's x axis |
| 43 | Normalized angle trace area, as measured by Measurement #42 divided by Measurement #8 |
| 44 through 93 | Coefficients 2–51, respectively, each divided by Coefficient 1, of a discrete Fourier transform of the maximum radius vector's magnitude, computed over 512 evenly spaced intervals as the maximum radius vector sweeps from 0° to 360° |
| 94 | Coefficient 1 of the discrete Fourier transform computed for Measurements #44–93 divided by 512, resulting in the average maximum radius over the 512 evenly spaced intervals |
| 95 | Normalized average radius, as measured by Measurement #94 divided by (Measurement #8/π)$^{1/2}$ |
| 96 | Scale independent symmetry around the prime coordinate frame's x axis |
| 97 through 146 | Coefficients 2–51, respectively, each divided by Coefficient 1, of a discrete Fourier transform of the number of pixels in the pixel set on both sides of the prime coordinate frame's x axis, computed over 256 evenly spaced intervals between x'$_{max}$ and x'$_{min}$ |
| 147 | Coefficient 1 of the discrete Fourier transform computed for Measurements #97–146 divided by 256, resulting in the average number of pixels on both sides of the prime coordinate frame's x axis over the 256 evenly spaced intervals |
| 148 | Normalized average width, as measured by Measurement #147 divided by (Measurement #8)$^{1/2}$ |

What is claimed is:

1. A system for distinguishing objects, comprising:
inputting circuitry for inputting first signals representative of the objects;
acquiring circuitry coupled to said inputting circuitry for acquiring measurements of a plurality of measurement types from said first signals, at least one of said measurement types being continuously variable;
determining circuitry coupled to said acquiring circuitry for determining respective amounts of mutual information of said measurement types in response to said measurements;
selecting circuitry coupled to said determining circuitry for selecting, in response to said respective amounts, a measurement type of said measurement types, and;
ordering circuitry coupled to said selecting circuitry for ordering each of said selected measurement types in an n-ary decision tree having branches for evaluation in distinguishing the object, where n is at least 3 and wherein said branches are only directly connected to a parent of said branches, adjacent branches being separated by a threshold value of said measurements.

2. The system as in claim 1, wherein said system further comprises evaluating circuitry coupled to said selecting circuitry for evaluating, in response to said selected measurement type, at least one measurement from a set of second signals from a location for distinguishing at least one of the objects as being represented in said set.

3. The system as in claim 2, wherein said evaluating circuitry is operable to distinguish said at least one of the objects with a specified reliability.

4. The system of claim 1, wherein said ordering circuitry is further operable to quantized each of said selected measurement type to form quantized measurement types being continuously variable, such that said decision tree includes each of said quantized measurement types for evaluation in distinguishing the objects.

5. The system of claim 1, wherein said system further comprises circuitry coupled to said ordering circuitry for traversing a path of said decision tree, such that multiple measurements from a set of second signals from a location are evaluated for distinguishing at least one of the objects as being represented in said set.

6. The system as in claim 1, wherein said system further comprises establishing circuitry coupled to said inputting circuitry for establishing, in response to a representation of the objects in said first signals, initial probabilities of the objects being represented in a set of second signals.

7. The system as in claim 6, wherein said establishing circuitry is operable to establish said initial probabilities in response to a proportionate representation of the objects in said second signals.

8. The system as in claim 1, wherein said measurement types are variably characteristic of the objects.

9. The system as in claim 1, wherein at least one of said measurement types is discretely variable.

* * * * *